United States Patent
Reilly et al.

(10) Patent No.: US 9,043,865 B2
(45) Date of Patent: May 26, 2015

(54) PRIORITIZED TOKEN BASED ARBITER AND METHOD

(75) Inventors: Craig P. Reilly, Bartlett, IL (US); Tyrone D. Bekiares, Park Ridge, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/601,748

(22) Filed: Aug. 31, 2012

(65) Prior Publication Data
US 2014/0068700 A1 Mar. 6, 2014

(51) Int. Cl.
| | | |
|---|---|---|
| G06F 21/00 | (2013.01) | |
| H04L 29/06 | (2006.01) | |
| G06F 15/173 | (2006.01) | |
| G06F 9/46 | (2006.01) | |
| H04L 12/417 | (2006.01) | |
| H04L 12/00 | (2006.01) | |

(52) U.S. Cl.
CPC .............. *H04L 63/20* (2013.01); *G06F 15/173* (2013.01); *G06F 9/468* (2013.01)

(58) Field of Classification Search
CPC ........ G06F 9/468; G06F 15/173; H04L 63/20
USPC ............... 726/1, 26, 27; 705/51, 59; 710/112; 370/395.41, 357
See application file for complete search history.

(56) References Cited

U.S. PATENT DOCUMENTS

| | | | | |
|---|---|---|---|---|
| 6,182,177 | B1 * | 1/2001 | Harriman ...................... | 710/112 |
| 8,365,293 | B2 * | 1/2013 | Brown et al. ................... | 726/26 |
| 2001/0047435 | A1 * | 11/2001 | Dove ............................. | 709/310 |
| 2004/0196162 | A1 * | 10/2004 | Brooke ......................... | 340/906 |
| 2005/0144401 | A1 * | 6/2005 | Pantalone et al. ............. | 711/151 |
| 2007/0130336 | A1 | 6/2007 | Hietala et al. | |
| 2007/0283012 | A1 * | 12/2007 | Chu et al. ...................... | 709/225 |
| 2013/0047263 | A1 * | 2/2013 | Radhakrishnan ............... | 726/27 |
| 2014/0022266 | A1 * | 1/2014 | Metz et al. .................... | 345/522 |

FOREIGN PATENT DOCUMENTS

WO   WO 02/096036 A1 * 11/2002

OTHER PUBLICATIONS

Ooki, M. ; Fukagawa, Y. ; Murakami, S. ; Yoshida, S.; "An approximate analysis of a token ring network with nonpreemptive priority under go-back-to-higher-priority discipline"; Computers and Communications, 1992.; Publication Year: Apr. 1992 , pp. 651-658.*
International Search Report for International Patent Application No. PCT/US2013/055927 mailed on Nov. 21, 2013.

* cited by examiner

*Primary Examiner* — Andrew Nalven
*Assistant Examiner* — Courtney Fields
(74) *Attorney, Agent, or Firm* — Steven A. May

(57) ABSTRACT

An apparatus and method for employing a token based arbiter. The apparatus includes a priority provider (26) comprising a processor for calculating an arbiter metric and an identity provider (18) having a processor for embedding the metric into a secured token. The apparatus also comprises memory coupled to the processor having one or more instructions executable at the processor. The processor is operable when executing the instructions to: collect authorization attributes (A) from one or more users seeking use of a resource (20) associated with a service provider; determine the level of priority to the one or more users based on prescribed policy of the priority provider; assign at least one arbiter metric (22, 32) to a secured token (T) for each of the one or more users based on the level of priority identified by the priority provider.

20 Claims, 5 Drawing Sheets

PRIORITIZED TOKEN BASED ARBITER AND METHOD

TECHNICAL FIELD

The present disclosure relates to a prioritized token based arbiter and method, and more specifically, a remote based arbiter providing access priority to authenticated users.

BACKGROUND

Public and privately shared resources, such as, fixed surveillance cameras and traffic light controllers, sensors, alarm systems, and the like are in demand, especially by first responders. First responders include, but are not limited to: police; emergency technicians or paramedics; firemen; private security employees; and neighborhood watch members.

One method of communicating to shared resources includes using the Internet or other distributed networks, whether local or global in size. Such receiving or transmitting of information or data to the Internet or distributed networks is made possible by numerous data protocol languages. An example of one communication protocol used for exchanging secured information between parties, such as first responders and shared resources over the Internet or distributed network includes Security Assertions Markup Language ("SAML").

SUMMARY

One example embodiment of the present disclosure includes an apparatus and method for employing a token based arbiter. The apparatus includes a priority provider comprising a processor for embedding arbiter metrics into a secured token. The apparatus also comprises memory coupled to the processor having one or more instructions executable at the processor. The processor is operable when executing the instructions to: collect authorization attributes from one or more users seeking use of a resource associated with a service provider; determine the level of priority to the one or more users based on a prescribed policy of the priority provider; assign at least one arbiter metric to a secured token for each of the one or more users based on the level of priority identified by the priority provider. The arbiter metric establishes a priority right to access a resource between the one or more users.

Another example embodiment of the present disclosure includes a system for arbitrating access between users of a resource. The system comprises a priority provider having one or more processors for calculating an arbiter metric, including at least one of a priority right and preemptive. The system also comprises an identity provider having one or more processors for embedding attributes into a secured token, the attributes comprising at least one of authorization rights and authentication rights, and arbiter metric. The system also includes memory coupled to the one or more processors comprising one or more instructions executable at the one or more processors. The one or more processors are operable when executing the instructions to: recognize at least one of the attributes in the secured token relative to the one or more users seeking use of a resource; and determine the level of access to the one or more users based on the priority right or preemptive right in the secured token relative to each user seeking access to a resource.

A further example embodiment of the present disclosure includes a method for arbitrating access between users to a resource. The method comprises the steps of embedding an arbiter metric into a secured token wherein the secured token is embedded into a non-transient computer readable medium by one or more processors. The arbiter metric comprising at least one of a priority right and preemptive right associated with each respective user of the users attempting to access a resource. The method also comprises embedding attributes into the secured token with the one or more processors, the attributes comprising at least one of authorization rights and authentication rights associated with each respective user of the users attempting to access a resource. The method further comprises the steps of reading at least one of the attributes in the secured token relative to the one or more users seeking use of a resource and determining a first level of access based on the attribute, and determining which user of the users attempting to access a resource cleared from the first level of access is entitled to exclusive access among the users to the resource based on the priority right or preemptive right in the secured token relative to each user seeking access to the resource.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Referring now to the figures generally wherein like numbered features shown therein refer to like elements throughout unless otherwise noted. The present disclosure relates to a prioritized token based arbiter and method, and more specifically, a remote based arbiter providing access priority to authenticated users.

Figure 1:
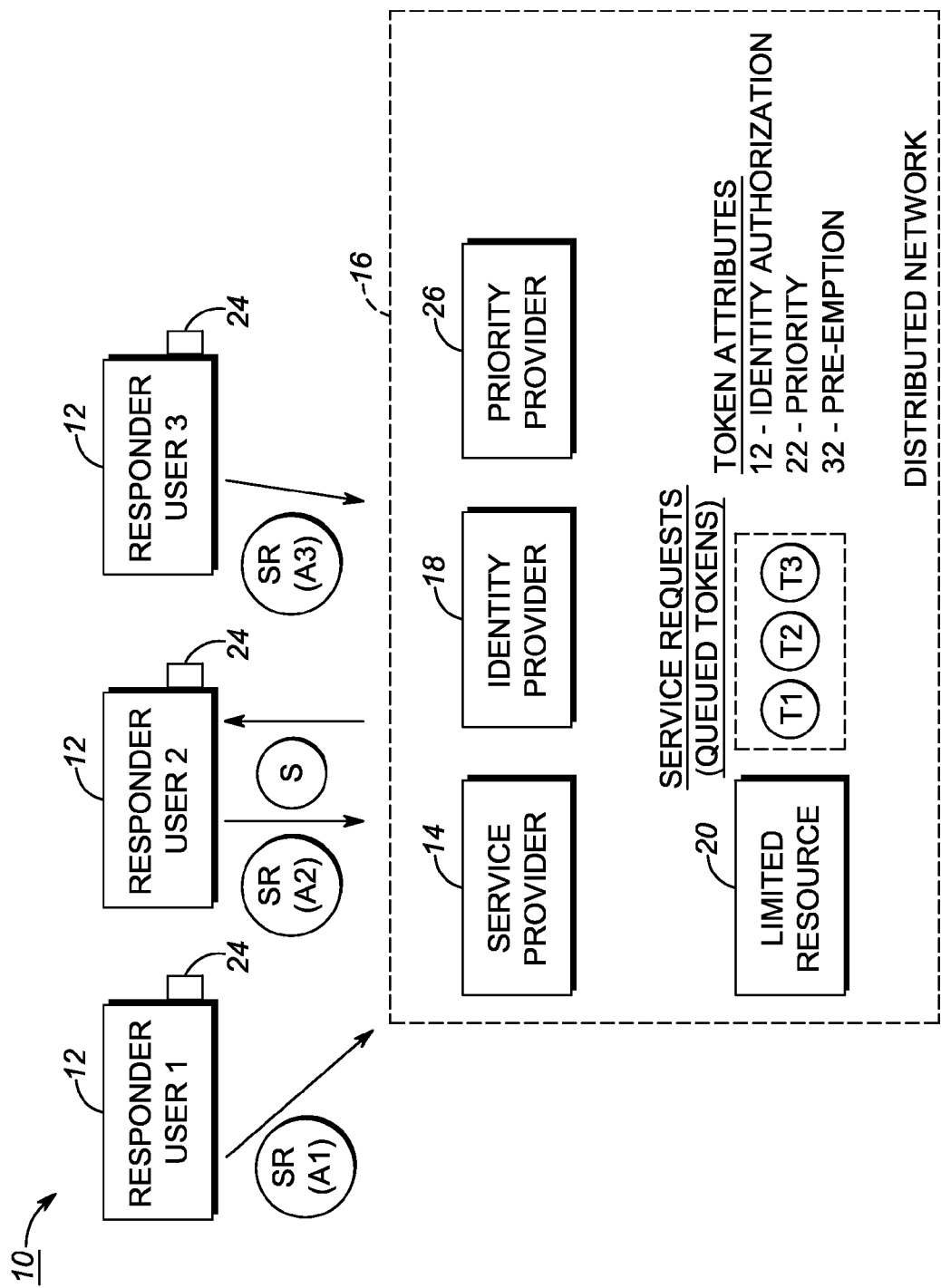
FIG. 1 illustrates a token based remote arbiter constructed in accordance with one example embodiment of the present disclosure.

FIG. 1 illustrates a token-based remote arbiter system 10 constructed in accordance with one example embodiment of the present disclosure, providing authentication, authorization, and priority/preemption access schemes for multiple users 12. Each user 12 seeks access to a limited service provider 14 via the Internet, web, cloud based application, Wi-Fi, or an over-the-air communication protocol (e.g., SAML), hereinafter defined as a distributed network 16. In one example embodiment, the service provider selectively 14 enables use of a shared or limited resource 20. A limited resource 20 can be either publically or privately shared and examples include, but are not limited to, surveillance cameras, traffic light controllers, sensors, alarm systems, and the like. Access to the service provider 14 and to the limited resource 20 through the distributed network 16 can be either locally or globally.

Only a single user 12 can have access to a limited resource 20, that is for example, floor control for a traffic light or pan and zoom on a camera at any given moment. Cameras may only be able to stream one additional local stream for viewing. The system 10 of the present disclosure advantageously provides a secured token T for providing priority in gaining access and/or control to the highest priority user from a plurality of users attempting to access or use the limited resource or service.

The distributed network 16 is constructed, in one example embodiment, to include an identity provider 18 that acts with a policy decision engine 26, which policy decision engine controls the external policies of the system 10. For example, in one embodiment, the system 10 comprises a priority metric 22 generated by the policy decision engine 26, which acts as an arbiter between users 12 and allows users or responders 12 to access the limited resource 20 in a prioritized manner. That is, multiple users 12 at the same time desire a limited resource 20, such as floor control of a traffic light or pan and zoom on a camera, but only one user 12 with authorization and the highest designated priority by the system 10 is capable of such control. The highest designated priority between users 12 by the system 10 may be functions of any one or more of the user's: role; agency affiliation; incident (severity of the accident, injury, or crime); and jurisdiction, as analyzed by the priority metric 22 of the system 10.

It should be appreciated that users or respondents 12 are police officers, emergency medical technicians, firefighters, security officers, and the like, but could also include private citizens without departing from the spirit and scope of the claimed disclosure. The respondent/users 12 may access the system 10 and distributed network 16 by an interface device 24 (see FIG. 2) using for example Wi-FI that includes, but is not limited to the following, dispatch controllers, radios, handsets, PDAs, mobile phones, MDTs, computer networks, and the like. Each interface device 24 is assigned an identity of the user 12, which is provided and known by the identity provider 18 of the system 10.

Each of interface devices 24, service provider 14, identity provider 18, and priority provider 26, and optionally limited resource 20, includes one or more processors, such as one or more microprocessors, microcontrollers, digital signal processors (DSPs), combinations thereof or such other devices known to those having ordinary skill in the art. Each processor is coupled to an at least one memory device (also referred to herein as "a memory"), such as random access memory (RAM), dynamic random access memory (DRAM), and/or read only memory (ROM) or equivalents thereof, that maintains data and programs/instructions that may be executed by the one or more processors and that allow the interface devices, service provider, identity provider, priority provider, and limited resource to perform all functions necessary to operate in the systems described herein, such as systems 10, 100, and 200. Unless otherwise specified herein, all functions described as being performed herein by the interface devices, service provider, identity provider, priority provider, and limited resource, is performed by their respective one or more processors, which are configured to perform such functionality based on the data and programs/instructions maintained in the corresponding memory.

In FIG. 1, each responder/user 12 communicates a service request "SR" to the service provider 14. With the service request, authentication credentials are provided specific to each user, for example, authentication credential A1 with respect to a user 1, authentication credential A2 with respect to a user 2, and authentication credential A3 with respect to a user 3. Either through a query by the identity provider 18, or from a request from the users 12 or service provider 14 to the identity provider, the identity provider requests, from the priority provider 26, an arbiter metric, which metric is based on priority 22 and/or preemption 32. The priority provider 26 then provides the metric(s) 22, 32, to the identity provider 18, which is a trusted identity provider. The identity provider 18 then provides the metric(s), in the form of a token T, to each user through the service provider 14, that is, a token T1 to user 1, a token T2 to user 2, and a token T3 to user 3, which tokens each sets a relative level or priority or preemption between the users. The service provider 14 then receives the tokens T and sets access between the users to the limited resource 20 accordingly.

Figure 2:
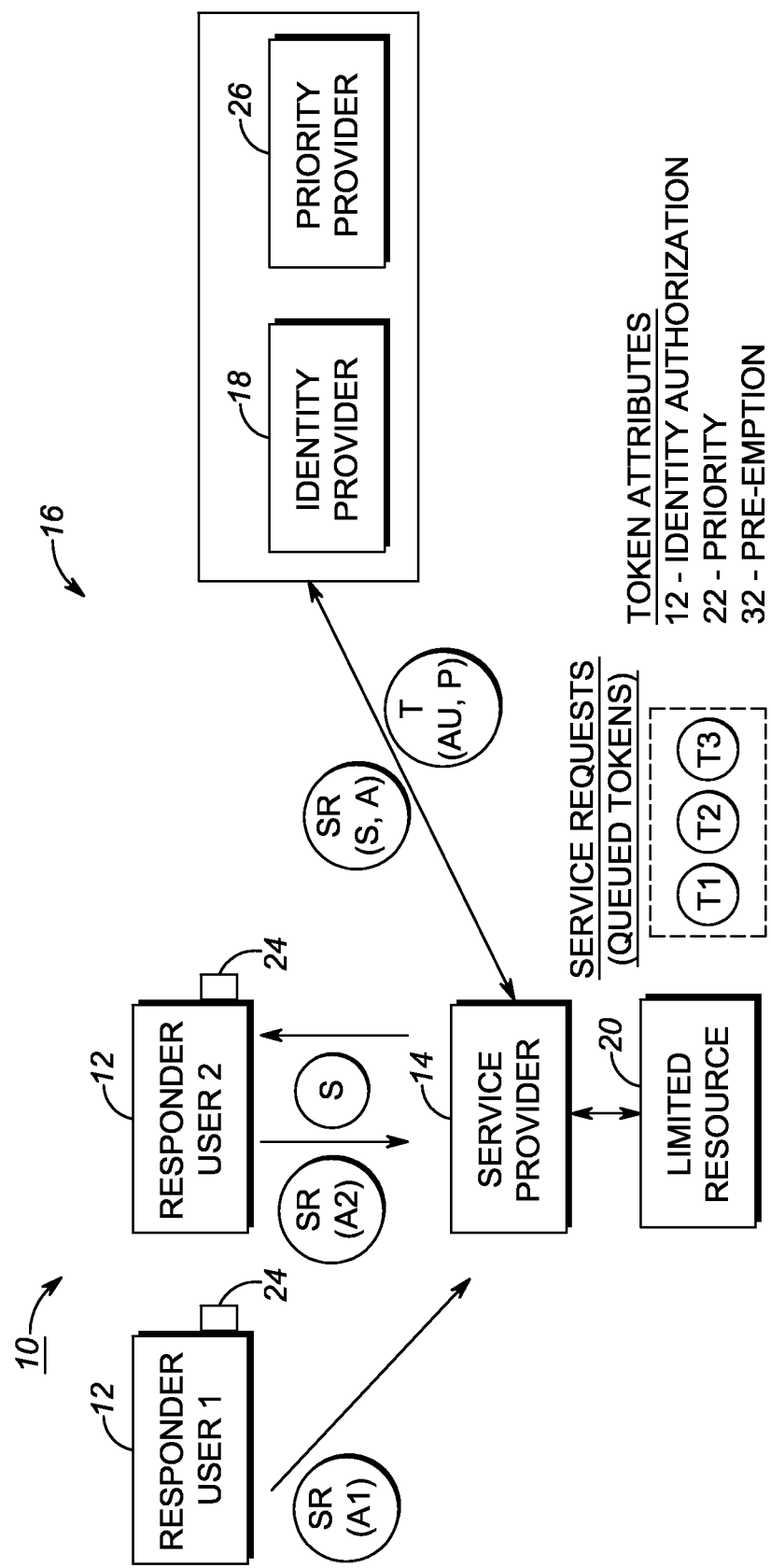
FIG. 2 illustrates a token based remote arbiter constructed in accordance with another example embodiment of the present disclosure.

Referring now to FIG. 2, is a token-based remote arbiter system 10 constructed in accordance with another example embodiment of the present disclosure. The system 10, in more detail, illustrates the interaction between the users 12, identity provider 18, service provider 14 and prioritized/preemptive access to the limited resource 20 via the policy engine 26 providing the priority metric 22 and preemption metric 32.

In particular, the identity provider 18 provides authorization credentials to each user 12 shown in FIG. 2, namely authorization credential A1 to user 1 and authorization credential A2 to user 2. While only two different users 12 are shown, it should be appreciated that an unlimited number of users could attempt to simultaneously gain access and use of the resource 20 without departing from the spirit and scope of the present disclosure.

The responders 12 each communicates a service request "SR" to the service provider 14. Each service request includes the identity and authorization credentials assigned to the user by the identity provider 18. Upon request by the service provider 14, or based on a query issued by the identity provider directly to the users, the identity provider 18 issues, to each user 12 through the service provider 14, a secure token T assigned to the user 12. The token T includes in addition to authorization "AU", arbiter metrics "P" such as priority metric 22 or preemption metric 32.

Service of the limited resource 20 is then provided to the user 12 having the highest priority. The arbiter metrics P is advanced by the priority provider 26 to the identity provider 18 based on a prescribed internal program or policy. The priority metric 22 provides priority access to users 12, allowing for advancement ahead of other users of the limited resource 20.

In the illustrated example embodiment, the identity provider 18 is remotely coupled to the priority decision engine 26, which is aware of the identity of each user 12. The priority decision engine 26 calculates the priority metric 22 and a preemption metric 32, and the identity provider 18 embeds the metrics within the secure token T. The limited resource 20 then is assigned to users by the service provider 14, or by the limited resource itself, by use the priority metric 22 and/or the preemption metric 32 embedded in the secured token T of each user 12 as illustrated in FIG. 2. The service provider 14 reads the secured token T of each user, relative to the secured tokens of the other users, in determining which users 12 at any given time has the highest priority and such highest priority user is granted exclusive access to the limited resource 20.

In the illustrated example embodiment of FIG. 2, the identity provider 18 embeds authorization and authentication attributes "A" into each secure token T. Once the authentication and authorization attributes A are confirmed by the service provider 14 or limited resource 20, the priority metric 22 and/or the preemption metric 32 of each user's secured token T is analyzed for each user 12 to determine use priority as described above.

Authentication and associated attributes refer to the process of identifying a user 12 of the system 10 via a credential, typically with a certificate or a user id and password. Authorization and associated attributes refer to the process of granting or denying access to the system 10. The system, in one example embodiment, employs a two-step security process. First is authentication, where each user's identity is verified. This step is then followed by authorization, which typically determines what resources or applications within the limited resource 20 the user 12 is permitted to use. It should be appreciated by those skilled in the art that it the priority metric 22 and preemptive metric 32 are embedded in the secured tokens T as an attribute.

In one example embodiment, the secured tokens' T priority metrics, preemption metrics, authorization, and/or authentication attributes are carried in metadata, as a header, or within a body of the distributed network 16 communication protocol. In the illustrated example embodiment, the communication protocol used for exchanging secured information between users 12 and the limited resource 20 is the Security Assertions Markup Language ("SAML"). In an alternative example embodiment, attribute profiles containing authorization and authentication attributes already exists with the user 12 to query additional attributes from the identity provider 18.

Once the authentication and authorization attributes A are confirmed by the service provider 14 or the limited resource 20, the limited resource is used based on the priority metric 22 and/or the preemption metric 32 embedded in the secured token T received from each user 12 through the service provider 14, as illustrated in FIG. 2. More particularly, the service provider 14 employs the secured tokens T in determining which user 12 at any given time has prioritized or preemptive rights over all other users, and if so, such user is granted exclusive access to the limited resource. Advantageously, the system 10 can arbitrate access or use of the metric 32 without any knowledge in either the resource 20 or service provider 14 of the policy algorithm used to calculate the metrics within the policy engine 26.

The secured token T allows users to not only assert authorization and authentication attributes A to the limited resource 20, but also to indicate access priority and preemption attributes as well. In the illustrated example embodiment of FIG. 2, the identity provider 18 is remotely located from the service provider 14 and limited resource 20. The identity provider 18, in addition to creating authorization/authentication, is also capable of embedding in the secured tokens T absolute priority attributes from the priority engine 26, which can be used for floor arbitration if multiple users 12 try to assert their respective secured token T at the limited resource 20 or to the service provider 14 simultaneously. In one example embodiment, the service provider 14 communicates with the identity provider 18 over a broad-band connection, and the users 12 communicate with the service provider 14 over a Wi-Fi connection.

Figure 3:
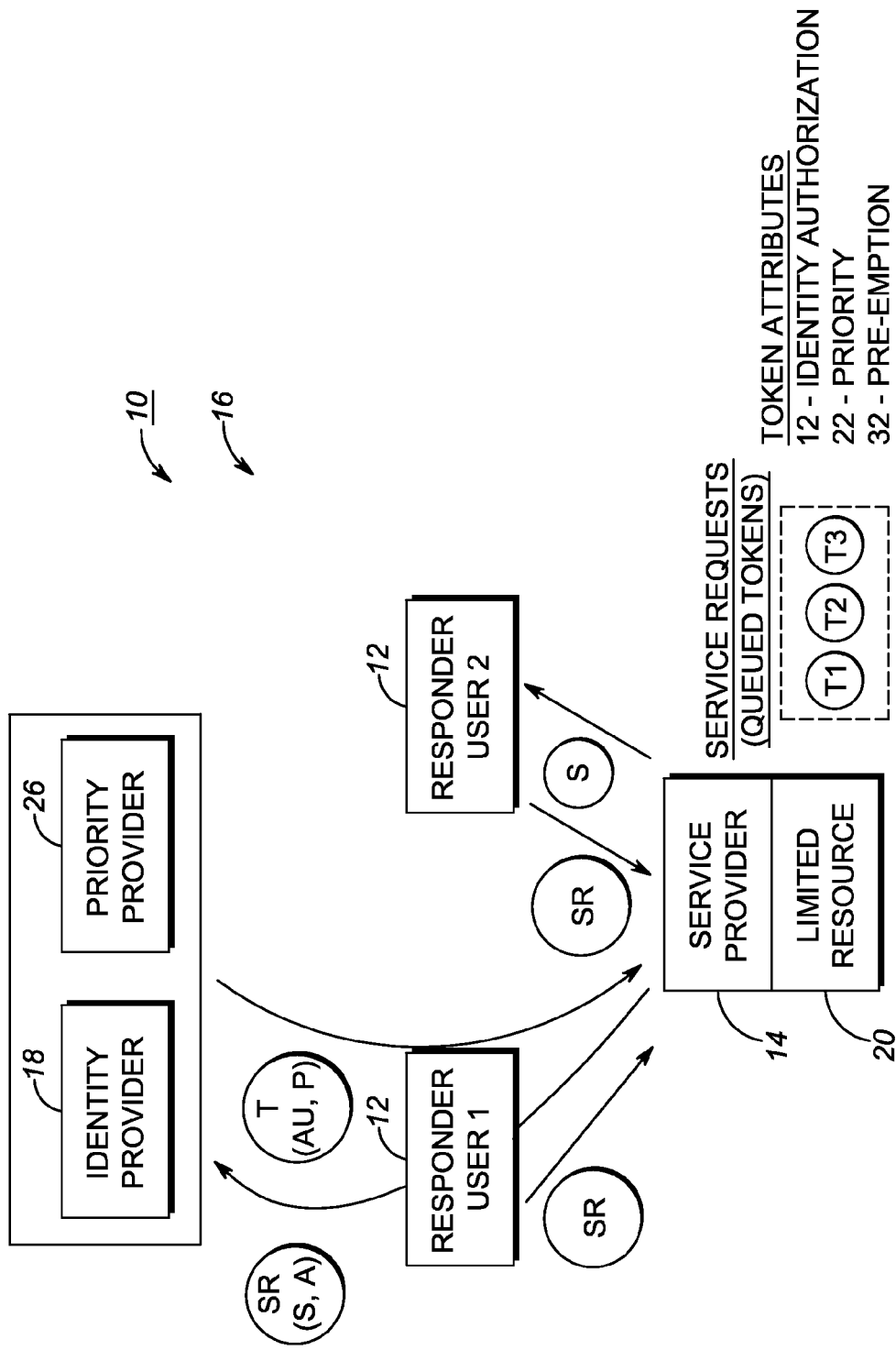
FIG. 3 illustrates a token based remote arbiter constructed in accordance with another example embodiment of the present disclosure.

Illustrated in FIG. 3 is a token-based remote arbiter system 10 constructed in accordance with another example embodiment of the present disclosure. The token-based arbiter system 10 comprises an identity provider 18 coupled to or in communication with a priority provider 26, and a service provider 14 in communication with a limited resource 20. The token-based remote arbiter system 10 resides within a distributed network 16, allowing for communication between users 12 and service provider 14, via, for example a Wi-Fi connection and between the service provider and identity provider 18 via, for example a broadband Internet connection.

During operation of the system 10, multiple users 12 request access in the form of a service request "SR" to a limited service or resource 20 through the service provider 14. Once the service request SR is received by the service provider 14 from an interface device 24 of the user 12, the service provider is queried by, or requests from the identity provider 18, token attributes in the form of priority metric 22 and/or the preemption metric 32. The priority metrics 22/preemption metrics 32 are assigned based on a programmable policy within a policy provider 26. The policy provider 26 communicates the priority and pre-emption metrics to the identity provider for each user. The identity of each user 12 is known by the identity provider 18 based on the authorization and authentication attributes "A". Once the priority and pre-emption metrics 22, 32 are conveyed by the priority provider 26 to the identity provider 18, the identity provider embeds the priority and pre-emption metrics into a secured token T and transmits to, or is queried from, the service provider 14. The service provider then allows service access 20 to the user with the highest priority and pre-emption attributes within the user's respective token T.

In one example embodiment, the token T includes priority and pre-emption attributes 22, 32, or "P", as well as authorization attributes "A". The limited resource 20 then grants access based on priority and pre-emption attributes found in the queued tokens T provided from the service provider 14.

Figure 4:
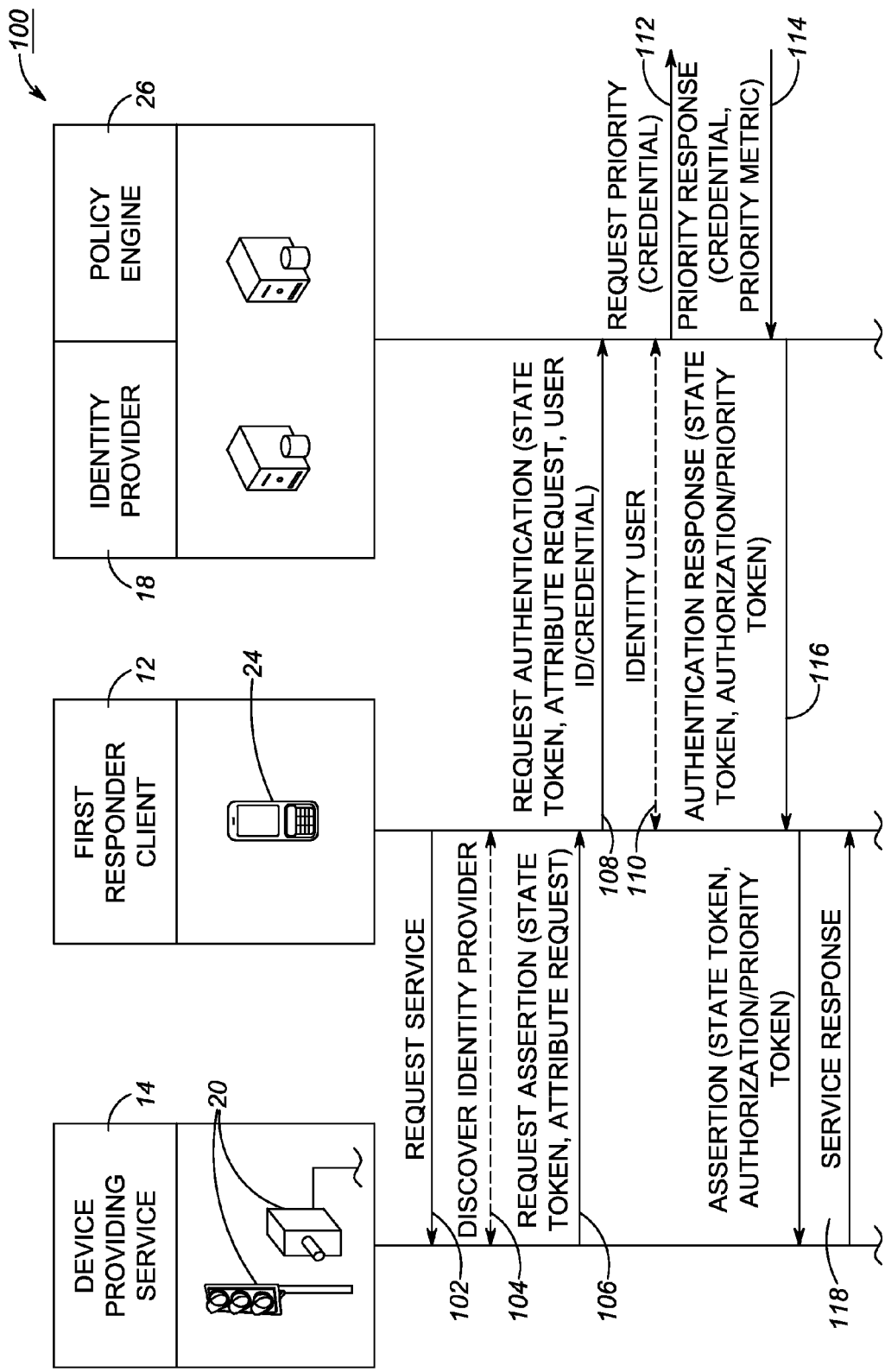
FIG. 4 is a flow diagram illustrating the operation of a token based remote arbiter constructed in accordance with one example embodiment of the present disclosure.

Referring now to FIG. 4, a flow diagram is provided illustrating the operation of a token-based remote arbiter system 100 constructed in accordance with another example embodiment of the present disclosure. The token-based remote arbiter system initiates its operation at 102 by a first responder or user 12 requesting service with a service provider 14 via an interface device 24. In the illustrated example embodiment, the interface device 24 is in the form of a mobile phone or PDA, but could be other communication devices without departing from the spirit and scope of the present disclosure. The service provider 14 controls and/or is in communication with the operation of a limited resource 20.

The limited resource 20 illustrated in FIG. 4 includes, for example, a traffic light or a security camera. At 104, the service provider 14 discovers the identity of the user 12. At 106, the service provider 14 conveys a request assertion to the first responder 12 for the responder/user's secured token T. Stated another way, the service provider 14 makes a request to the user 12 for the attributes found in the secured token T.

At 108, the user 12 conveys an authentication request to identity provider 18. The identity provider 18 includes a policy engine 26 that is either integral to, or remotely connected to, the identity provider. Referring again to FIG. 4, at 110 the identity provider 18 identifies the user 12. At 112, a priority credential is made, forming the priority metric 22 and/or the preemptive metric 32. At 114, the policy engine 26 fulfills the priority metric request to the identity provider 18. At 116, the identity provider 18 bundles the authentication and authorization attributes A, priority metric 22, and/or pre-emption metric 32 into a secured token T, and sends the secured token to the user 12. Once received by the user 12, the interface device or user 12 sends the secured token T to the service provider 14 associated with the operation of the limited resource 20 or directly to the limited resource.

Once the secured token T is received by either the service provider 14 and/or limited resource 20, the service provider/limited resource uses the priority metric 22 and/or preemptive metric 32 included in the token for decisive allocation of the limited resource usage, and a service response is provided to the user 12, that is, the service provider/limited resource indicates, to the user, the user's access to the limited resource, for example, granting or denying the user access to the limited resource. In one example embodiment, the limited resource 20 is a fixed surveillance system, such as IP cameras with built in access control to process secured tokens T using an SAML protocol. In another example embodiment, an interface device to process secured tokens T is located internally to sensors for residential or commercial security.

It should be appreciated that in the illustrated example embodiment of FIG. 4, the policy provider 26 may be implemented by a Certificate Authority (CA), which CA may, in various embodiments, be included in a Policy Changing Rule Function (PCRF) or may include a PCRF, and includes a built-in interface that allows a secured token T-based request for a priority metric 22 or preemptive metric 32 from a user 12 during or after transmission of the token to the limited resource 20 and/or service provider 18. Alternatively, the tokens T may be served directly and include dynamic or static priority and preemption metrics, 22, 32, respectively. Illustrated in FIG. 5 is a token-based remote arbiter system 200 having dynamic priority and preemptive metrics 22, 32, respectively that is constructed in accordance with one example embodiment of the present disclosure.

The arbiter system 200 uses the secured tokens T to provide the limited resource 20 the capability to preempt or reject access attempts based on the embedded priority or preemption metrics, 22, 32, respectively. The metrics 22, 32 are calculated using the priority provider, or decision engine, 26 with many potential inputs that change dynamically, such as the user's role, jurisdiction, state of emergency, and the like. The token T in one embodiment contains an attribute describing the role of the users 12, which can be used to statically arbitrate access among users to a limited resource 20.

Figure 5:
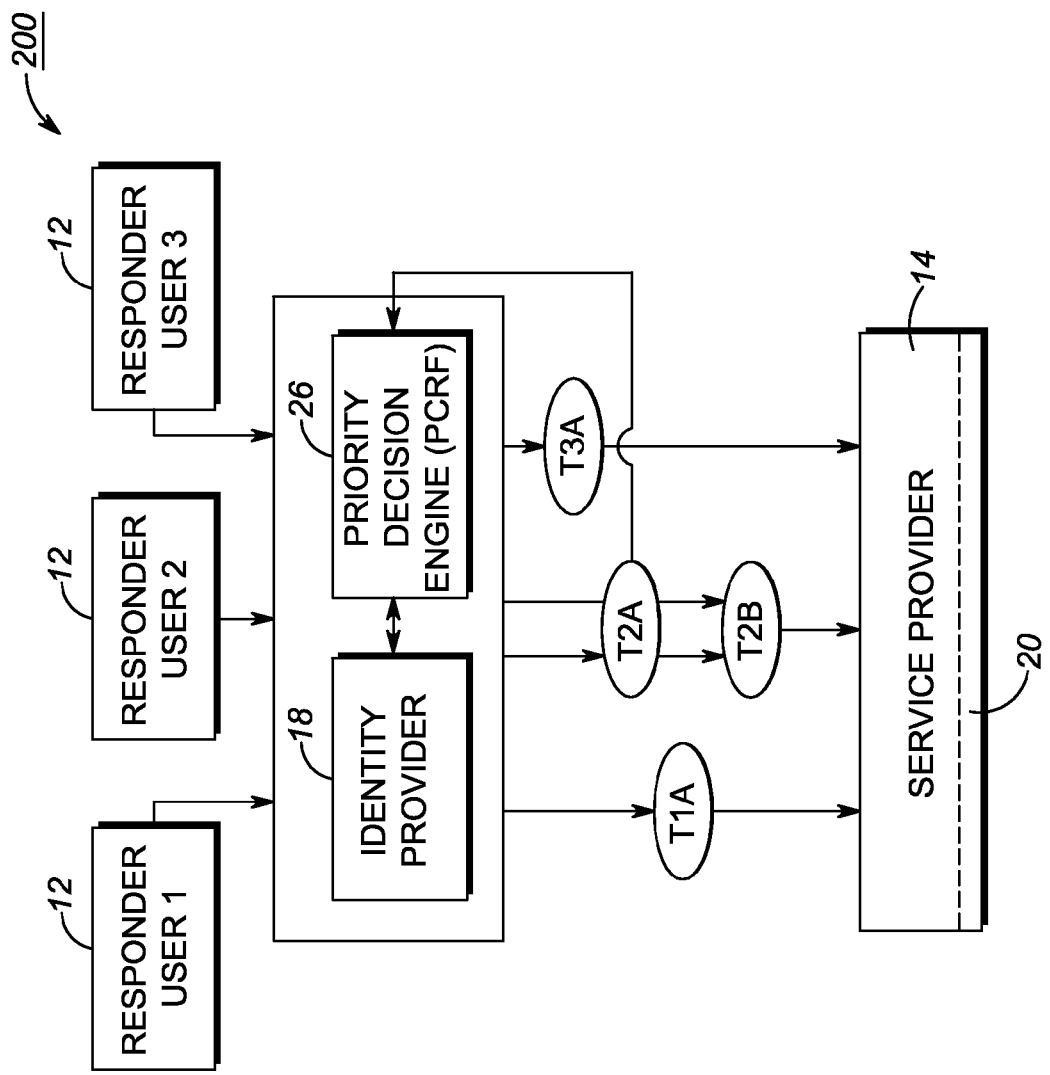
FIG. 5 illustrates a token based remote arbiter having dynamic priority and preemptive metrics constructed in accordance with one example embodiment of the present disclosure.

Using a dynamic priority metric 22 of the example embodiment of FIG. 5 allows the device providing service 20 to grant access to the highest priority user 12 based on the many inputs into the priority decision engine 26. Dynamic priority is also used in the illustrated example embodiment to prevent access for users currently at normal or lower priority (i.e., not associated with an emergency incident) for restricted or limited resources 20. As a situation or emergency evolves, user's priority can be dynamically altered and the user can request new secured tokens T and potentially take control over other users of the limited resource 20 as illustrated in FIG. 5. Additionally, lower priority users will not be able to interrupt a resource 20 currently in use by a higher priority user.

In one example embodiment, the priority provider, or decision engine, 26 may be a Policy Changing Rule Function "PCRF", having an interface for allowing the assigned priority metric 22 and/or preemptive metric 32 to be queried and reassigned new priority or preemptive values throughout the operation of seeking and/or obtaining use of the resource 20. The newly assigned priority or preemptive values in the metrics 22, 32, influence and change the exclusive access rights between multiple users 12.

In FIG. 5, simultaneous use is sought by three users 12. Initially, user 1 possessed the highest priority secured token T, indicated by token T1A, over secured tokens assigned to users 2 and 3, indicated by tokens T2A and T3A. An incident occurs, that elevates the priority rights of the user 2 under the policies of the priority decision engine or PCRF 26. Accordingly, a subsequent secured token indicated by T2B is requested by user 2 and submitted to the limited resource 20 or service provider 14. The dynamic change afforded to user 2 provides now higher priority to user 2, thus surpassing the rights of user 1, allowing user 2 access or exclusive rights to use the limited resource 20.

What have been described above are examples of the present disclosure. It is, of course, not possible to describe every conceivable combination of components or methodologies for purposes of describing the present disclosure, but one of ordinary skill in the art will recognize that many further combinations and permutations of the present disclosure are possible. Accordingly, the present disclosure is intended to embrace all such alterations, modifications and variations that fall within the spirit and scope of the appended claims.

What is claimed is:

1. An apparatus comprising:
a limited resource comprising:
one or more processors that are configured to analyze arbiter metrics included in secured tokens associated with one or more users seeking access to the limited resource; and
memory coupled to the one or more processors comprising one or more instructions executable at the one or more processors, the one or more processors operable when executing the instructions to:
receive, from each of one or more user devices associated with the one or more users, a secured token issued by a network element, the secured token comprising at least an absolute preemptive metric;
determine a highest preemptive right user among the one or more users seeking access to the limited resource by reading the absolute preemptive metric included in each secured token associated with the one or more users; and
allow the user having the highest preemptive right to have exclusive access to the limited resource.

2. The apparatus of claim 1 wherein the secured token further comprises both authentication and authorization attributes.

3. The apparatus of claim 1 wherein the limited resource is one or more of a surveillance camera, a traffic light controller, a sensor, and an alarm system.

4. The apparatus of claim 1, wherein the limited resource is configured to determine the highest preemptive right user by reading the arbiter metric assigned to each secured token associated with each of the one or more users.

5. The apparatus of claim 4 wherein the limited resource is configured to determine a highest priority right user by reading the arbiter metric assigned to each secured token associated with each of the one or more users.

6. The apparatus of claim 1 further comprising an identity provider that is configured to assign authentication attributes to each secured token.

7. The apparatus of claim 1 further comprising an identity provider that is configured to assign authorization attributes to each secured token.

8. The apparatus of claim 5 wherein the one or more processors are operable when executing the instructions to:
determine a level of priority or each of the one or more users based on a prescribed policy of a priority provider.

9. The apparatus of claim 1 wherein the instructions are Security Assertion Markup Language instructions.

10. The apparatus of claim 1 wherein the apparatus comprises a Policy Changing Rule Function (PCRF) having an interface allowing the arbiter metrics to be queried by an identity provider for inclusion in the secured tokens.

11. A method for arbitrating access between users to a resource, the method comprising the steps of:

embedding an arbiter metric into a secured token, wherein the secured token is embedded into a non-transient computer readable medium by one or more processors of one or more network elements, the arbiter metric comprising a preemptive right associated with the user when attempting to access a resource;
embedding attributes into the secured token with the one or more processors, the attributes comprising at least one of authorization rights and authentication rights associated with the user attempting to access the resource;
conveying, by the one or more network elements, the secured token to a user device associated with the user;
receiving, by another network element from the user device when attempting to access the resource, the secured token, wherein the secured token comprises the preemptive right associated with the user and the attributes comprising at least one of authorization rights and authentication rights associated with the user;
in response to receiving the secured tokens from the user device, reading, by the another network element, at least one of the attributes in the secured token relative to one or more users seeking use of the resource and determining a first level of access based on the attribute; and
determining, by the another network element, which user of the one or more users attempting to access the resource cleared from the first level of access is entitled to exclusive access among the users to the resource based on the preemptive right in the secured token.

12. The method of claim 11 wherein the one or more network elements comprises an identity provider, the identity provider having an interface, the interface allowing the assigned secured token's arbiter metric to be queried by the identity provider.

13. The method of claim 12 wherein the one or more network elements comprises a priority provider remote from the identity provider, the identity provider embedding the attributes into the secured token with the one or more processors.

14. The method of claim 13 further comprising the step of:
assigning a prescribed policy to the priority provider for forming the arbiter metric based on at least one of the user's role, experienced incident, emergency type, and jurisdiction.

15. The method of claim 14 further comprising the step of:
dynamically changing the arbiter metric based on a change in at least one of the user's role, experienced incident, emergency type, and jurisdiction.

16. The method of claim 11 further comprising the step of:
providing the user device with an interface device for accessing the identity provider and soliciting the resource.

17. A system for arbitrating access between users of a resource, the system comprising:
a network-based priority provider having one or more processors for calculating an arbiter metric comprising a preemptive right;
a network-based identity provider having one or more processors for embedding attributes into a secured token, the attributes comprising at least one of authorization rights and authentication rights, and the arbiter metric; and
one or more of a service provider and a resource that is configured to:
receive the secured token from a user device;
recognize at least one of the attributes in the secured token relative to one or more users seeking use of a resource; and
determine the level of access to the one or more users based on the priority right or preemptive right in the secured token relative to each user seeking access to the resource.

18. The system of claim 17 wherein the identity provider includes a Policy Changing Rule Function (PCRF), having an interface allowing the secured token's arbiter metric to be queried by the identity provider.

19. The apparatus of claim 8 wherein the prescribed policy of the priority provider forming the arbiter metric is a dynamic policy based on at least one of the user's role, experienced incident, emergency type, and jurisdiction.

20. The system of claim 17 wherein the resource is one or more of a surveillance camera, a traffic light controller, a sensor, and an alarm system. provider throughout the operation of seeking and obtaining use of the resource.

* * * * *